Jan. 24, 1939.   E. WILDHABER   2,145,000
MACHINE FOR GENERATING GEARS
Filed May 31, 1935   3 Sheets-Sheet 1
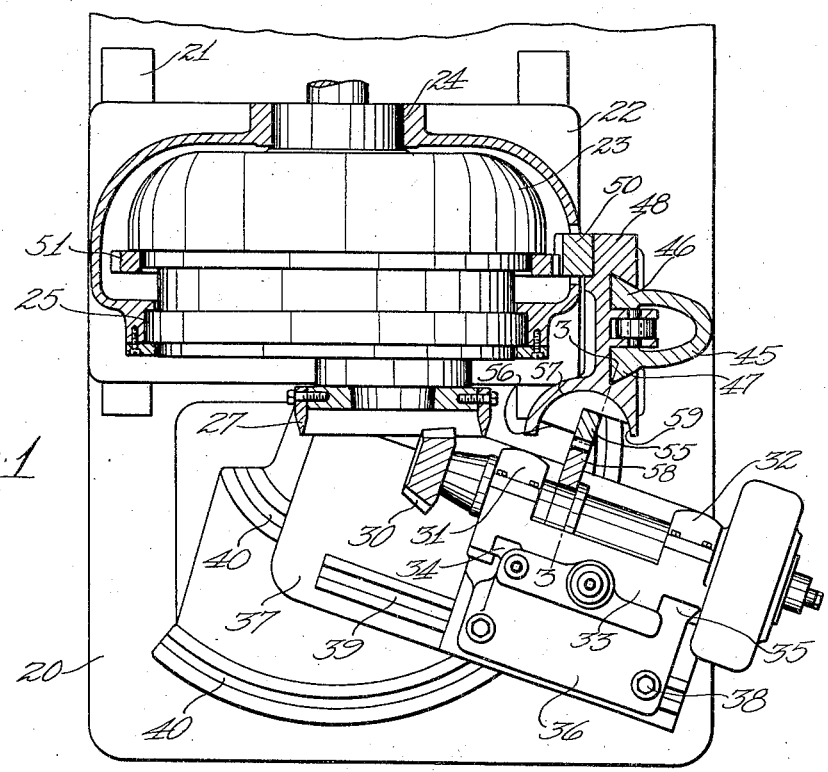
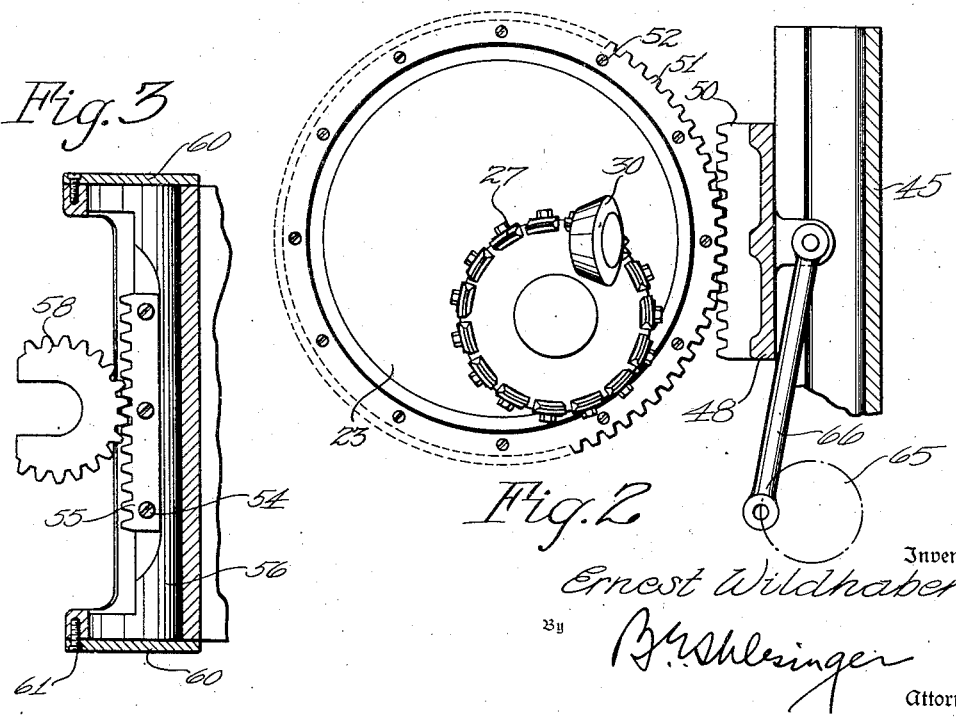
Inventor
Ernest Wildhaber
By B. Y. Schlesinger
Attorney

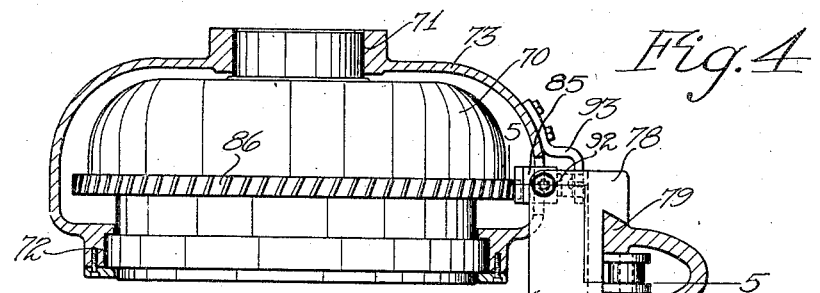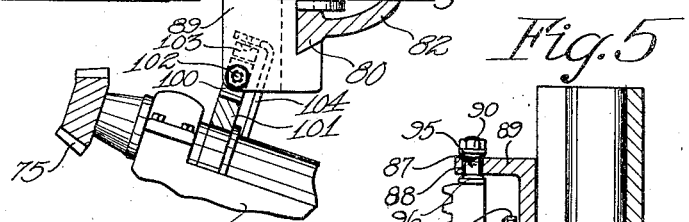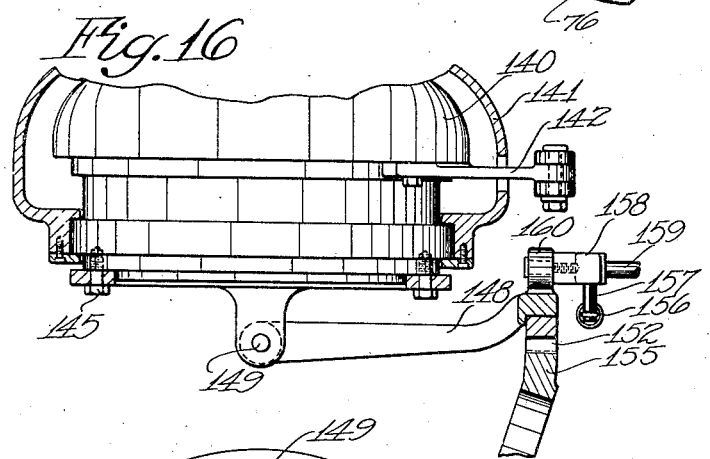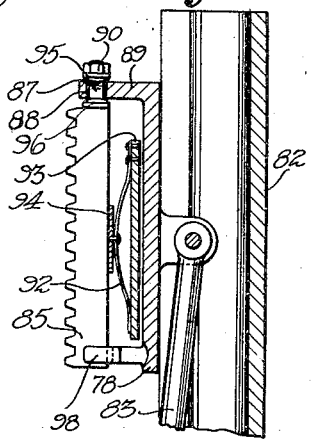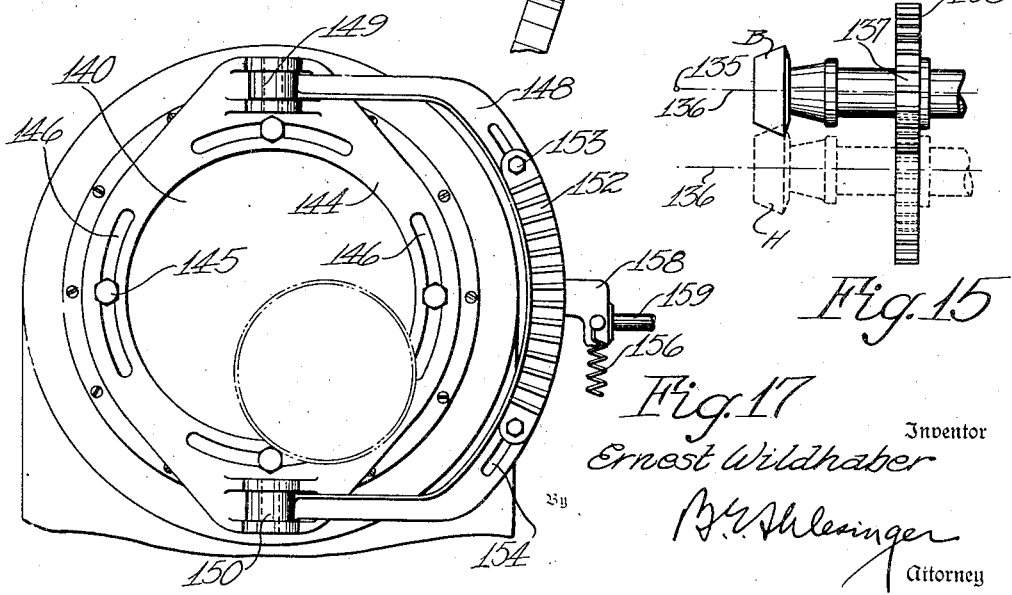

Jan. 24, 1939.    E. WILDHABER    2,145,000
MACHINE FOR GENERATING GEARS
Filed May 31, 1935    3 Sheets-Sheet 3
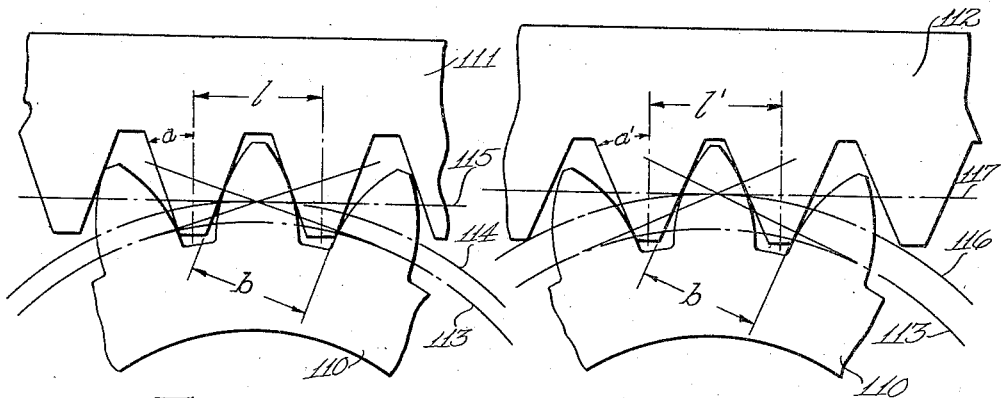
Fig. 6    Fig. 7
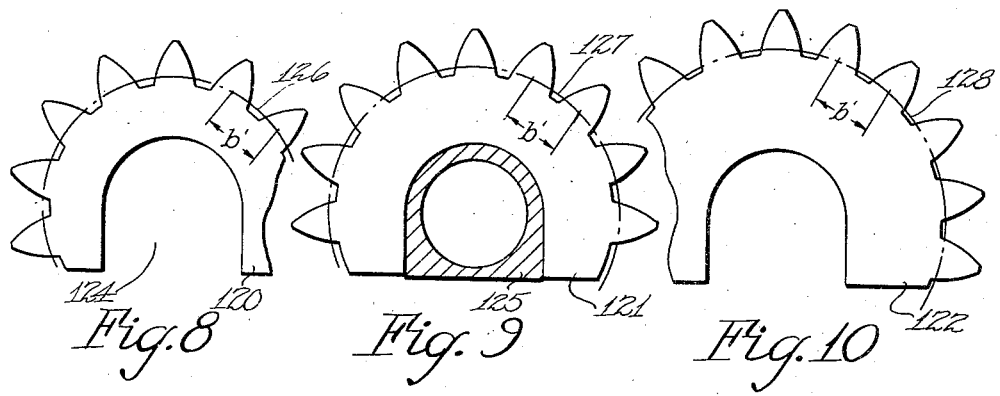
Fig. 8    Fig. 9    Fig. 10
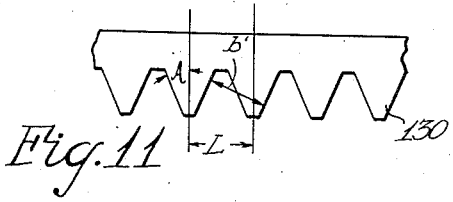
Fig. 11
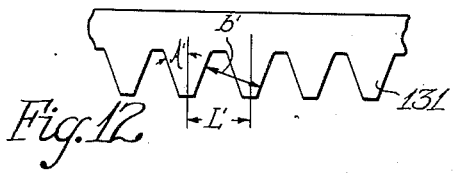
Fig. 12
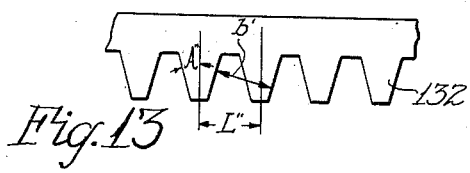
Fig. 13
Fig. 14
Inventor
Ernest Wildhaber
By
B. Schlesinger
Attorney Patented Jan. 24, 1939

2,145,000

UNITED STATES PATENT OFFICE 2,145,000

MACHINE FOR GENERATING GEARS

Ernest Wildhaber, Irondequoit, N. Y., assignor to Gleason Works, Rochester, N. Y., a corporation of New York Application May 31, 1935, Serial No. 24,198

11 Claims. (Cl. 90—4)

The present invention relates to machines for generating gears particularly bevel and hypoid gears and to a system of gearing for use in such machines in producing the generating roll.

For jobbing work where a great quantity of different types and ratios of gears are to be cut, the so-called "geared-roll" type of bevel and hypoid gear generator is customarily used. In this type of machine, the cradle and work spindle are driven in the timed relation required to produce the generating roll by trains of gearing which include sets of change gears. The change gears are inexpensive and can be changed readily to obtain any desired ratio of roll between the cradle and the work spindle that may be required to generate a given job. Because of the gear trains and the amount of shafting required, however, the "geared-roll" types of machines are relatively complicated and relatively expensive.

For automotive production work, therefore, in some cases, a simpler form of machine has been designed known as the "segment-roll" type of machine. Here the generating mechanism includes a pair of segments, one of which is fixed relative to the tool mechanism and one of which is secured to the work spindle. When the cradle is oscillated, one segment rolls on the other imparting the required ratio of relative movements between the work and the tool mechanism.

Since only an oscillating mechanism for the cradle and a pair of segments are required for producing the generating movement, these "segment-type" machines are comparatively simple in construction and cheap. The segments themselves in automotive sizes, however, are expensive and it is impractical therefore to use these machines in a shop where the work is of a universal character. Further than this, the "segment type" machines have heretofore been built only for the generation of bevel gears.

One purpose of the present invention is to provide a tapered gear generating machine which will be substantially as simple in construction and as cheap as a "segment roll" machine but which, at the same time, will be more universal in character.

A further object of the invention is to provide a generating machine for tapered gears which will be simple in construction but on which hypoid as well as bevel gears can easily be cut.

Another object of the invention is to provide a system of gearing applicable not only to machines built according to the present invention but also to existing types of gear cutting machines such as the "segment roll" type of machines, and through which the number of gear members required for producing different ratios of roll may be reduced and the whole range of work within the capacity of a given machine may be covered with a comparatively small number of ratio gear members.

Other objects of the invention will be apparent hereinafter from the specification and from the recital of the appended claims.

In the drawings:

Fig. 1 is a plan view partly in section, of a tapered gear generating machine built according to the present invention;

Fig. 2 is a somewhat diagrammatic view looking at the cutter-carrying cradle and showing the drive to the same in section and the relative positions of cutter and work for a given job;

Fig. 3 is a section on the line 3—3 of Fig. 1;

Fig. 4 is a fragmentary plan view corresponding to Fig. 1 and illustrating a modification of the invention;

Fig. 5 is a sectional view taken on the line 5—5 of Fig. 4;

Figs. 6 and 7 are diagrammatic views illustrating the principles upon which the system of gearing of the present invention rests and showing how the same spur gear segment may be meshed with two different racks;

Figs. 8, 9 and 10 and Figs. 11, 12 and 13, respectively, show three different spur gear segments and three different racks which are all of the same base pitch so that any one of the segments may be meshed with any one of the racks to obtain a great number of different ratios;

Fig. 14 is a diagrammatic view showing graphically the difference between the different members of a system of gearing constructed according to the present invention;

Fig. 15 is a diagrammatic view showing how on a machine built according to the present invention, the same gearing may be employed for producing the ratio of roll either in generation of a bevel pinion or a hypoid pinion;

Fig. 16 is a fragmentary plan view, partly in section, of a "segment roll" type of gear generating machine constructed to use segments selected according to the system of gearing of the present invention; and Fig. 17 is a view looking at the cutter-carrying cradle of this machine.

In one embodiment of the present invention, the generating roll is effected through a pair of racks, one of which meshes with a spur gear or segment connected to the cradle and the other of which meshes with a spur gear or segment connected to the work spindle. The two racks are mounted upon the same slide and by actuating one of the spur gear members or the slide, the desired ratio of rolling movement can be produced between the cradle and the work. Any ratio of roll may be obtained by changing one of the segments or one of the racks or both a segment and a rack.

In connection with the present invention, I have, also evolved a system of gearing whereby with but a small number of racks and segments, all ratios within the range of the machine can be cut. This system of gearing is applicable also to present type "segment-roll" machines.

This system involves the use of a series of racks or crown gear segments and a series of spur or bevel gears which may be in the form of segments. The racks or crown gear segments of a series are of the same base pitch but of different linear pitch and pressure angle and are so selected that the linear pitch of one member of the series is a definite percentage greater than the linear pitch or pressure angle of the next lower member of the series. The spur or bevel gears of a series mesh with the racks or crown gear segments, respectively, and are of the same base pitch as the racks or crown gear segments respectively but have different tooth numbers, respectively, and the tooth numbers of the different spur or bevel gears are so selected that the tooth number of one member is a definite percentage greater than the tooth number of the next lower member of the series. This system is based upon two well known properties of involute gears (1) that a given involute gear will mesh with any rack of the same base pitch regardless of the linear pitch or pressure angle of the rack and (2) that gears of the same circular pitch but different tooth numbers will mesh with any rack of the same base pitch.

Reference will be had first to Figs. 1 to 3 inclusive which illustrate a machine built according to one embodiment of this invention. 20 designates the base or frame of this machine. It is provided with ways 21. The carriage 22 slides on these ways to feed the cutter into cutting depth and withdraw it from depth for indexing of the blank. The cradle 23 is suitably journaled in bearings 24 and 25 formed on the carriage. As shown, the cradle 23 is a full circular cradle according to known construction. The face-mill gear cutting tool 27 is mounted in any known or suitable manner upon the cradle.

The gear or pinion 30 to be cut is secured in any suitable manner to the work spindle of the machine which is journaled in the bearings 31 and 32 of a work head 33. The work head 33 is vertically adjustable upon the ways 34 and 35 of a column 36. The column 36 is mounted on a plate 37 for sliding adjustment thereon in a direction axial of the work spindle and may be secured in any position of its adjustment by bolts 38 which engage in the T-slots 39 formed in the plate 37. The plate 37 is angularly adjustable upon the base 20 of the machine and may be secured in any position of its angular adjustment by bolts (not shown) which engage in the arcuate T-slots 40 formed on the upper face of the base.

The adjustments of the cutter and of the work are well known in the art and will not therefore be described in further detail here. The novel feature of the machine is the means for producing the generating roll. Secured to the base 20 of the machine at one side of the cradle is an upright or guide 45. This guide is U-shaped in cross section and is formed with ways 46 and 47. The slide 48 is mounted to reciprocate vertically upon these ways. This slide 48 carries a wide-faced rack 50 which meshes with a spur gear 51 that is secured by screws 52 to the cradle 23. The rack 50 may be integral with the slide 48 or fixedly secured thereto in any suitable manner. The slide 48 also carries a second rack 55. This rack is secured by screws 54 to a supporting member 56 that has a cylindrical peripheral surface 57 which fits into a cylindrical bearing or recess 59 formed in the slide 48 at one side thereof.

The rack 55 is adapted to mesh with a spur gear segment 58 that is secured in any suitable manner to the work spindle of the machine or to a sleeve in which the work spindle is mounted.

The supporting member 56 may be loosely enough mounted in its bearing 59 as to be free to float therein and find its correct angular position when the plate 37 is adjusted angularly on the base 20 to adjust the pitch angle position of the work. The supporting member 56 is held in its bearing 59 by plates 60 which are secured in position by screws 61.

In the embodiment of the invention shown, the slide 48 is actuated by a crank indicated at 65 which is connected by the rod 66 with the slide. As the crank rotates, it will be seen that a reciprocating movement is imparted to the slide 48 and to the racks 50 and 55 causing the cradle 23 to oscillate on its axis and simultaneously rocking the work segment 58. The gearing 51—50 and 58—55 are so selected as to impart the required ratio of movements between the cradle and the work required to generate proper tooth profiles on the gear being cut.

The machine may be operated in known fashion, that is, the carriage 22 may be first actuated to feed the continuously rotating cutter into depth, then the slide 48 may be moved in one direction to impart the generating movement to the cradle and the work and then, when the tooth profiles have been completely generated, the carriage 22 may be withdrawn to withdraw the cutter from operative position, and then the roll may be reversed and the blank indexed. Other methods of operating the machine will be obvious to those skilled in the art. Preferably, the index mechanism will be of the notched plate type and be actuated from the roll as in known types of "segment-roll" machines. In fact, the identical index mechanisms used on "segment-roll" machines may be used also on a machine constructed according to my invention. The indexing may take place during the return stroke of the slide 48 or at the end of the return stroke of this slide, as may be desired.

A further possible embodiment of the invention is illustrated in Figs. 4 and 5. Only part of the machine has been shown. The cutter-carrying cradle is designated at 70. It is journaled in bearings 71 and 72 formed in the carriage 73. The pinion 75 to be cut is mounted as before on a work spindle journaled in the work head 76. The generating motion is produced by reciprocation of a slide 78 which moves on ways 79 and 80 of a column 82. The slide 78 may be reciprocated, as before, from a crank through a connecting rod 83.

In this embodiment of my invention, the racks which actuate the cradle and the work are pivotally mounted upon the slide 78 and are spring-pressed into engagement with their respective gears or segments so as to take up back-lash. Thus, the rack 85 which meshes with the spur gear 86 is secured only at one end to the slide 78 and this connection is such as to allow a free swinging movement of the rack toward and from the axis of the gear. The rack is formed with an integral stud 87 which passes through a slot 88 in a projecting arm 89 of the slide 78. A nut 90 threads on the stud 87 to hold the rack on the slide. The slot 88 is wider than the diameter of the stud 87 so that the stud can rock in the slot.

The rack 85 is resiliently held in engagement with the spur gear 86 by a leaf-spring 92 which is riveted to a bracket or arm 93 that is bolted to the carriage 73. There is a shoe 94 riveted to the bowed portion of the leaf-spring 92 which presses against the back of the rack 85. Opposed spherical washers 95 and 96 may be placed on the stud 87 at opposite sides of the arm 89 of the slide 78 so as to allow the minute free rocking movement of the rack 85 required to take up the back-lash. A forked projection 98 at the bottom of the slide 78 straddles the rack 85 to hold it against sidewise-sway.

The rack 100 which meshes with the segment 101 that is connected to the work spindle of the machine, is mounted on the slide 78 in a manner similar to the mounting of the rack 85 upon this slide. The rack 100 is carried by a pivot stud 102 and is spring-pressed into engagement with the segment 101 by a leaf-spring 103 which is secured to a bracket or arm 104 that is fixed in any suitable manner to the work head 76 of the machine.

In some instances it may be desirable to obtain a slightly different ratio of roll between the tool and the work during the depth feed in roughing the teeth of a gear. This may be done very readily in a machine constructed according to the present invention. The spur gear or spur gear segment 86 connected to the cradle may be provided with helical teeth and the mating rack 85 also. Then by actuating the carriage 73 during generation an additional rotary movement will be imparted to the cradle 70 over and above any rotary movement imparted to the cradle by actuation of the slide 78 for the axial movement of the gear 86 on the rack 85 will itself impart a rotary movement to the cradle. Thus the ratio of relative roll between the work and the cutter will be modified.

In machines constructed according to the present invention, only the pair of gears which actuate the work need be changed in order to generate a gear or pinion of a different ratio. Further than this, I have discovered a system of gearing whereby all gear ratios from 1 to 1 up to 6 to 1 may be covered with but 15 racks corresponding to the racks 55 or 100 and 36 segments corresponding to the segments 58 or 101 without resorting to any radial adjustment of the segment. Radial adjustment of the segments introduces errors especially in the cutting of pinions. The racks are straight sided and the segments have teeth of involute profile. The system is based upon certain properties of involute gearing which will now be described.

In Figs. 6 and 7, a spur gear segment 110 is shown meshing with two different racks 111 and 112, respectively. The racks 111 and 112 have teeth of different pressure angles, $a$ and $a'$, respectively, and they are of different linear pitch, $l$ and $l'$, respectively; but they are of the same base pitch $b$ and their base pitch is the same as the base pitch of the gear 110. Therefore, the gear 110 meshes correctly with either rack 111 or 112. A gear having teeth of involute profile will mesh with any straight sided rack of the same base pitch regardless of the pressure angle or linear pitch of that rack.

In Figs. 6 and 7, 113 designates the base circle of the segment 110. This is, of course, fixed but the pitch circle of the segment is not determined until it is meshed with another gear or rack and its location depends upon the form of that other gear or rack. Thus, in Fig. 6 the rolling pitch circle of the segment 110 is designated at 114 and it rolls on the pitch line 115 of the rack 111. In Fig. 7 the rolling pitch circle of the segment 110 is designated at 116 and it rolls on the pitch line 117 of the rack 112.

In Figs. 8 to 10 inclusive, there are shown three different segments such as may be employed in the system of gearing of the present invention. These segments 120, 121 and 122 have all the same base pitch $b'$ but they have, respectively, different base-circle diameters and different numbers of teeth on their full circumference. The base-circles of the gears are indicated at 126, 127 and 128, respectively. The segments are slotted as indicated at 124 so that they may readily be slipped on or off the machine. In Fig. 9, one of the segments is shown in position on the work head 125 of the machine.

The tooth numbers of the whole gears, of which the segments form a part, are as a rule not integral numbers. Whenever reference is made to the tooth numbers of the segments it is to be understood that the tooth number of the full gear, of which the segment is a part, is meant. In my system of gearing, the series of segments used are so selected that one segment of the series has a tooth number which is a definite percentage greater than the tooth number of the next lower member of the series. The percentage of difference may be selected at will. I have found that a very convenient selection of ratios may be obtained when the tooth number of one segment of the series is made 5.12% larger than the tooth number of the next lower segment of the series, that is, when it is equal to $$\left(1+\frac{1}{300}\right)$$

15 times the latter tooth number. Thus, if we assume that the segments 120, 121 and 122 shown are three successive segments in the series, the segment 121 will have 5.12% more teeth than the segment 120 and the segment 122 will have 5.12% more teeth than the segment 121.

In Figs. 11 to 13 inclusive there are shown three different racks 130, 131 and 132, respectively, which may form three successive racks of a series to be used in the present invention and which may be meshed at will, respectively, with any of the segments 120, 121 or 122, etc.

The racks 130, 131 and 132 all have the same base pitch $b'$ and this base pitch is the same as the base pitch $b'$ of the segments 120, 121 and 122, etc., which are to be used with the racks. The racks differ from one another in pressure angle and in linear pitch. Thus, the rack 130 has a pressure angle A and a linear pitch L while the rack 131 has a different pressure angle A' and a different linear pitch L' and the rack 132 has a still different pressure angle A'' and a still different linear pitch L''. The percentage of difference between the linear pitches of the different racks of a series may be selected according to convenience for the field of ratios to be covered. I have found that a convenient selection and coverage is obtained when each rack of the series has a linear pitch ⅓% larger than the linear pitch of the next lower member of the series. Thus, if we assume that the racks 130, 131 and 132 are successive members of a series, the linear pitch L' of the rack 131 will be ⅓% larger than the linear pitch L of the rack 130 and the linear pitch L'' of the rack 132 will be ⅓% larger than the linear pitch L' of the rack 131.

With the arrangement of racks and segments described, we can obtain 15 times 36 equals 540 different combinations of mating racks and segments. Each combination obtained gives a different ratio which is ⅓% larger than the ratio of the next lower combination. Rack 130 may be meshed with segment 120, or segment 121, or segment 122 or with any one of the other of the 36 segments forming the series and in turn segment 120, or segment 121, or segment 122 or any of the other of the 36 segments may be meshed with rack 130 or rack 131 or rack 132 or any of the other of the 15 racks forming the series.

As already stated, with this system all ratios from 1 to 1 to 6 to 1 can be cut with an accuracy well within the highest practical requirements. The ratios of the different combinations of racks and segments obtainable differ from one another ⅓ of 1%. For a cradle roll of say 20°, this difference is only $$4'\left(20 \times \frac{60}{300} = 4'\right)$$

In the most unfavorable case, then, the desired ratio is midway between two obtainable ratios or 2' off on the cradle roll. Such a small difference is negligible but may be corrected, if desired, with a slight change in the position of the work head.

Fig. 14 indicates diagrammatically how the different members of the series of racks or of the series of segments differ from one another. The distance KL may represent the radius of the base circle of the first member of the series of segments or the linear pitch of the first member of the series of racks. The distance KM represents, then, the radius of the base circle of the second member of the series of segments or the linear pitch of the second member of the series of racks and the distance KN represents the radius of the base circle of the third member of the series of segments or a linear pitch of the third member of the series of racks, etc. It will be noted that the successive radii or successive linear pitches are successively greater amounts larger than one another. Each radius or each linear pitch, as stated, is a definite percentage larger than the next lower radius or linear pitch. In other words, the radii of the successive gear segments or the linear pitches of the successive racks are arranged in a geometrical progression.

One of the advantages of a generating drive constructed according to the present invention is that it can be employed both in the generation of bevel pinions and in the generation of hypoid pinions. In fact, for generating a hypoid pinion of a given ratio, the same segments and racks may be employed as in generating a bevel pinion of a corresponding ratio. This is illustrated in Fig. 15. Here 135 represents the center or axis of the cradle of the machine. When a bevel pinion B is to be generated, the work head 33 is preferably adjusted on the column 36 so that the axis 136 of the work spindle intersects the axis 135 of the cradle. For generating the tooth profile of the pinion B a suitable segment 137 and rack 138 are selected. If a hypoid pinion A is to be generated, the work head is adjusted on the column 36 so that the axis 136 of the work spindle is offset from the axis 135 of the cradle as indicated by the dotted line position of Fig. 15. If the hypoid pinion is a member of a ratio corresponding to that of which the bevel pinion B is a member, the spur gear segments 137 can again be used for generating the tooth profiles. The spur gear segment 137 simply meshes with the rack 138 at a different point along the length of the rack at the center of the roll of the machine.

The principles upon which is selected a system of gearing according to the present invention can also be applied to known crown gear and segment drives such as are now employed on "segment-roll" types of machines. In this case, 15 crown gear segments and 36 bevel gear segments will cover the whole field completely to the same extent as the system of racks and segments above described.

In Figs. 16 and 17, an improved construction of a bevel gear generating machine is illustrated, employing a crown gear and segment to produce the generating roll. The cutter-carrying cradle is designated at 140. It is journaled in an upright or carriage 141 and is oscillated from a crank or cam through the lever arm or link 142. 144 designates a ring or plate which is rotatably adjustable upon the face of the cradle 140 and which is secured in any position of its adjustment by bolts 145 which pass through arcuate slots 146 in the plate 144 and thread into the face of the cradle.

A U-shaped bracket 148 is pivotally mounted at 149 and 150 between ears formed on the plate 144. The bracket 148 is adapted to carry a crown gear segment 152. The segment 152 is adjustably secured to the bracket by bolts 153 which pass through arcuate slots 154 in the bracket 148. The slots 154 and 146 are curved about the axis of the cradle as the center. The crown gear segment 152 is adapted to mesh with a bevel gear segment 155 which is secured to the work spindle of the machine. The crown gear segment is resiliently held in engagement with the segment 155 by a coil-spring 156 which is secured at one end to a relatively fixed part of the machine and at its opposite end to a stud 157. The stud 157 projects laterally from one side of a block 158 that is secured to a stud 159 which is rotatably mounted in a relatively fixed part of the machine. The block 158 also carries a roller 160. This roller is mounted to roll on the back of the bracket 148 and the spring 156 operates through the block 158, stud 159 and roller 160 to resiliently hold the crown gear segment 152 in engagement with the segment 155 and take up back-lash between the crown gear segment 152 and the segment 155. The rotatable adjustment of the plate 144 on the cradle permits of adjusting the cradle angularly without disturbing the mean point of mesh between the crown gear segment 152 and the bevel gear segment 155.

A series of crown gear segments and bevel gear segments may be selected whereby all different ratios from 1 to 1 to 6 to 1 can be cut with accuracy within desirable practical limits and using but 15 crown gear segments and 36 bevel gear segments, selected according to the principles already described.

While different embodiments of the invention have been illustrated, it will be understood that the invention is capable of further modifications. This application is intended to cover any variations, uses or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. A machine for generating tapered gears comprising a tool support, a work support, a work spindle journaled in the work support, a cradle upon which one of said supports is mounted, and means for rotating the cradle and work spindle in timed relation to impart a relative rolling movement between the tool and work comprising a gear train consisting of a spur gear member secured to the cradle coaxially thereof, a rack meshing therewith, a spur gear member mounted coaxially of the work spindle and connected thereto, a rack meshing therewith, means connecting the two racks so that they move together, and means for actuating one member of the train to impart movement to the other members thereof.

2. A machine for generating tapered gears comprising a tool support, a work support, a work spindle journaled in the work support, a cradle upon which one of said supports is mounted and means for rotating the cradle and work spindle in timed relation to impart a relative rolling movement between the tool and work comprising a slide, and a gear train consisting of a rack connected to the slide, a spur gear member secured to the cradle coaxially thereof and meshing with said rack, a second rack secured to the slide, and a spur gear member connected to the work spindle coaxially thereof and meshing with said second rack, and means for reciprocating said slide in the linear direction of the racks to cause said gear members to roll on their respective racks.

3. A machine for generating tapered gears comprising a tool support, a work support, a work spindle journaled in the work support, a cradle upon which one of said supports is mounted, and means for controlling the ratio of relative rotation of the cradle and the work spindle comprising only two pairs of gear elements, one member of one pair being secured to the cradle and one member of the other pair being secured to the work spindle, the other members of the two pairs being connected to move together, and means for actuating simultaneously the other members of the two pairs to produce a rolling motion between the tool and the work.

4. A machine for generating tapered gears comprising a tool support, a work support, a work spindle journaled in the work support, a cradle upon which one of said supports is mounted, and means for rotating the cradle and work spindle in timed relation to impart a relative rolling movement between the tool and the work comprising a gear train consisting solely of a spur gear member secured to the cradle a rack meshing therewith, a spur gear member connected to the work spindle, and a rack meshing therewith, means connecting the two racks so that they move together, means for actuating one member of the train to impart movement to the other members thereof, and means for taking up back-lash between said racks and spur gear members as they roll together.

5. A machine for generating tapered gears comprising a tool support, a work support, a work spindle journaled in the work support, a cradle upon which one of said supports is mounted, and power transmitting means for rotating the cradle and work spindle in timed relation to impart a relative rolling movement between the tool and work comprising a slide, a pair of spur gear members and a pair of racks meshing, respectively, with said spur gear members, one of said spur gear members being secured to the cradle and the other spur gear member being connected to the work spindle, and said racks being pivotally mounted on said slide, means resiliently urging said racks about their respective pivots to hold them in engagement with the respective mating spur gear members, and means for actuating one of the members of the power transmitting means to impart simultaneously movement to the other members thereof.

6. A machine for generating tapered gears comprising a tool support, a work support, a work spindle journaled in the work support, a cradle upon which one of said supports is mounted, a carriage on which the cradle is mounted and which is reciprocable in a direction axial of the cradle, and means for rotating the cradle and work support in timed relation comprising a gear train consisting of a helical spur gear member connected to the cradle, a helical toothed rack meshing therewith, a spur gear member connected to the work spindle, and a rack meshing therewith, means connecting the two racks so that they move together, means for actuating one member of the train to impart movement to the other members thereof and means for imparting reciprocating movement to said carriage.

7. A machine for generating tapered gears comprising a tool support, a work support, a work spindle journaled in the work support, a cradle upon which one of said supports is mounted, and means for rotating the cradle and work spindle in time relation to impart a relative rolling movement between the tool and work comprising a gear train consisting of a spur gear member secured to the cradle coaxially thereof, a rack meshing therewith, a spur gear member connected to the work spindle coaxially thereof, a rack meshing therewith, means connecting the two racks so that they move together, and means for actuating one member of the train to impart movement to the other members thereof, and means for adjusting the work support to offset the axis of the work spindle from the axis of the cradle.

8. A machine for generating tapered gears comprising a tool support, a work support, a work spindle journaled in the work support, a cradle upon which one of said supports is mounted, and means for rotating the cradle and work spindle in timed relation to impart a relative rolling movement between the tool and work comprising a slide, a rack connected to the slide, a spur gear member secured to the cradle and meshing with said rack, a second rack secured to the slide, a spur gear member connected to the work spindle and meshing with said second rack, and means for reciprocating said slide, one of said racks being pivotally mounted at one end on said slide, and means for resiliently urging said rack about its pivot into mesh with its mate spur gear.

9. A machine for generating tapered gears comprising a tool support, a work support, a work spindle journaled in the work support, a cradle upon which one of said supports is mounted, means for adjusting the work support about an axis inclined to the axis of the cradle to determine the root angle of the gear to be cut, and means for rotating the cradle and work spindle in timed relation to impart a relative rolling movement between the tool and work comprising only a gear train consisting of a spur gear member secured to the cradle coaxially thereof, a slide, a rack secured to the slide and meshing with said spur gear member, a second rack secured to the slide and adjustable angularly thereon in accordance with the angular adjustment of the work support, a second spur gear member operatively connected to the work spindle coaxially thereof and meshing with said second rack, and means for actuating one of the members of said train.

10. A machine for generating tapered gears comprising a tool support, a work support, a work spindle journaled in the work support, a cradle upon which one of said supports is mounted, a helical gear member secured to the cradle, a slide, a helically toothed rack secured to the slide and meshing with said helical gear member, a second rack secured to the slide, a spur gear member connected to the work spindle and meshing with said second rack, means for actuating one of the members of the described gear train to rotate the cradle and work spindle, and means for moving the cradle axially.

11. A machine for generating tapered gears comprising a tool support, a work support, a work spindle journaled in the work support, a cradle upon which one of said supports is mounted, said cradle having its axis angularly disposed to the axis of the work spindle, and means for rotating the cradle and work spindle in timed relation comprising a gear train consisting only of a cylindrical gear secured to the cradle coaxially thereof, a rack meshing with said cylindrical gear, a second rack which is angularly disposed with reference to the first rack, a cylindrical gear mounted coaxially of the work spindle and connected thereto and having an operative connection with the second rack, and means connecting the two racks so that they move together, and means for actuating one member of said train to impart movement to the other members thereof.

ERNEST WILDHABER.